INVENTOR,
Leo Haubert,

L. HAUBERT.
POWER DELIVERING ATTACHMENT FOR AUTOMOBILE TRUCKS OR TRACTORS.
APPLICATION FILED JUNE 30, 1920.
1,391,109.
Patented Sept. 20, 1921.
2 SHEETS—SHEET 2.
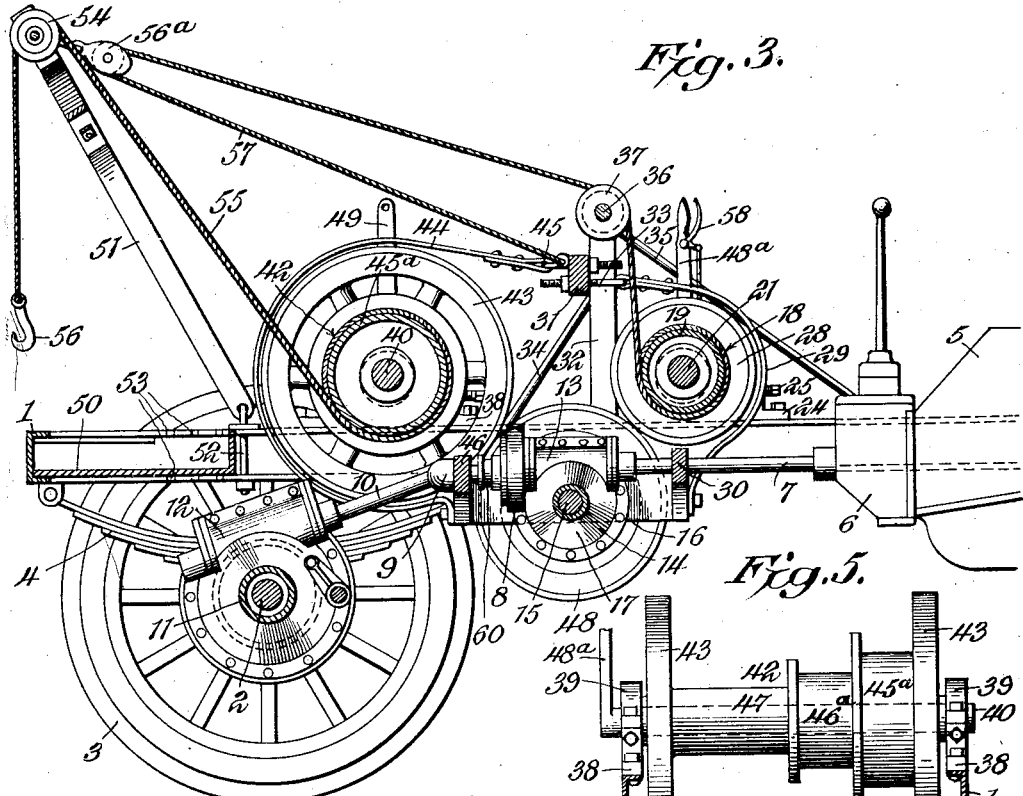
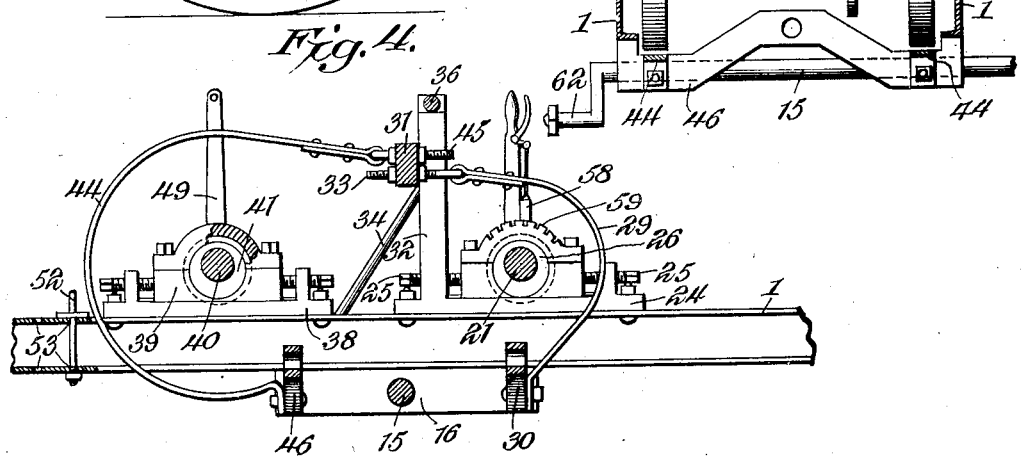
Leo Haubert, INVENTOR,
WITNESSES
BY
ATTORNEY

UNITED STATES PATENT OFFICE.

LEO HAUBERT, OF MUSKOGEE, OKLAHOMA.

POWER-DELIVERING ATTACHMENT FOR AUTOMOBILE TRUCKS OR TRACTORS.

1,391,109.

Specification of Letters Patent. Patented Sept. 20, 1921.

Application filed June 30, 1920. Serial No. 393,088.

*To all whom it may concern:*

Be it known that LEO HAUBERT, a citizen of the United States, residing at Muskogee, in the county of Muskogee and State of Oklahoma, has invented a new and useful Power-Delivering Attachment for Automobile Trucks or Tractors, of which the following is a specification.

This invention has reference to power delivering attachments for automobile trucks or tractors, and its object is to provide means whereby the power unit of the truck may be utilized for various purposes, while the vehicle is standing still.

In accordance with the invention winding drums are located on the frame of the truck and are provided with means whereby the drums may be rotated for actuating lifting tackle and may be braked or otherwise held stationary when a lifted load is maintained against dropping or lowered under control, or other operations are performed by means of the power furnished by the power unit of the truck, at the will of the operator.

The invention is adaptable to existing automobile trucks with a minimum of change, whereby the utility of the truck is very greatly enhanced, while the cost of the attachment and the amount of work needed to apply the attachment is minimized.

The invention will be best understood from a consideration of the following detailed description taken in connection with the accompanying drawings forming part of this specification, with the understanding, however, that the invention is not confined to any strict conformity with the showing in the drawings but may be changed and modified so long as such changes and modifications mark no material departure from the salient features of the invention as expressed in the appended claims.

In the drawings:

Fig. 3 is a front to rear vertical section of what is shown in Figs. 1 and 2, with the plane of the section toward the observer's side of the longitudinal center line of the truck.

Fig. 4 is a front to rear section with some parts in elevation, of the winding drums and brake means therefor, but with the driving means omitted.

Fig. 5 is a cross section of the truck frame and one of the winding drums, portions of the structure being omitted.

Figure 1:
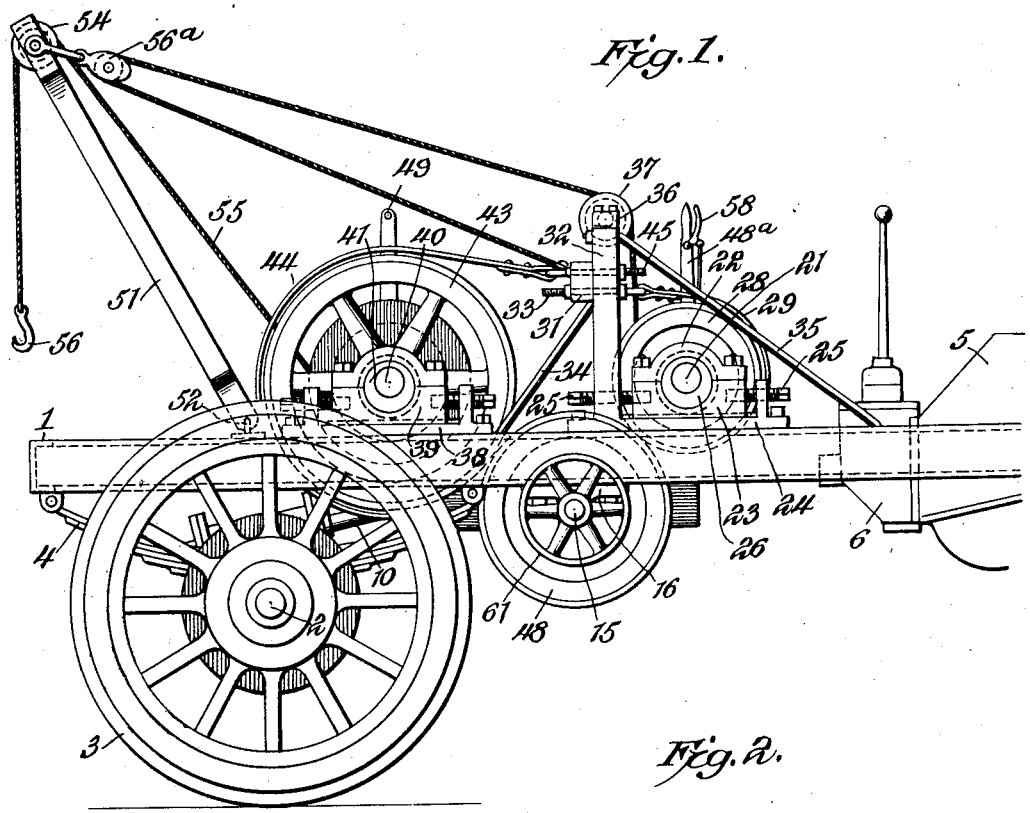
Figure 1 is a side elevation of the rear portion of an automobile truck with the attachment applied.
Figure 2:
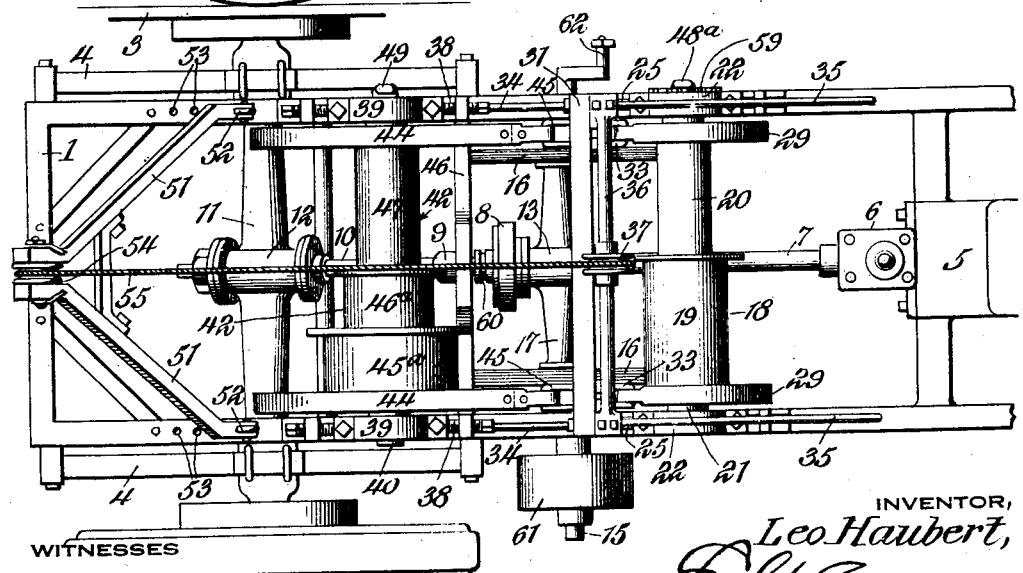
Fig. 2 is a plan view thereof.

Referring to the drawings there is shown a main chassis frame 1 which may be constructed in accordance with the usual practice and so needs no particular description. The showing includes the rear axle 2, rear wheels 3 and rear springs 4 with which automobile trucks are usually provided. In Figs. 1, 2 and 3 there is a fragmentary showing of the engine or power unit 5 without any attempt to show details thereof, for the power unit need not differ from like parts of commercial trucks. The engine 5 transmits power through the customary transmission indicated by a transmission casing 6 through a driving shaft represented by the customary driving shaft casing or housing 7 leading from the transmission casing toward the rear of the machine. The driving shaft 7 is continued for an appropriate distance and is provided with a clutch 8, on any appropriate type, schematically represented by an exterior view of such clutch without any attempt to show its more minute construction.

The shaft 7 terminates in a universal joint 9, also only generally indicated, and this universal joint is connected to the forward end of another drive shaft 10 in turn leading to the usual differential gearing on the axle 2 and inclosed in a casing 11 of customary construction. The shaft 10 carries a worm inclosed in a casing 12 and engaging a worm wheel acting on the rear axle 2 through the customary differential, which latter is not shown as it need not differ from the differentials ordinarily employed in connection with the worm drive of automobile trucks.

The shaft 7 includes a worm indicated by a worm casing 13 and this worm, through a worm gear inclosed in a worm gear casing 14, is used to drive a jack-shaft 15 suitably incased and supported by the main frame or chassis through appropriate journal bearings 16 which may be made fast to the chassis. The jack-shaft casing is indicated at 17, particularly in Fig. 2.

Forward of the jack-shaft there is provided a winding drum 18 which, as shown in Fig. 2 has two winding surfaces 19, 20 of different diameters, but it is to be understood that the winding drum may be of like diameter throughout or have a greater number of winding surfaces than two. The drum is carried by a shaft 21 mounted at the ends in journal bearings 22 carried by blocks 23 slidable in guideways 24 secured on the chassis frame 1. By means of set screws 25 the blocks 23 may be adjusted forwardly or rearwardly as conditions may demand. The shaft 21 is carried at each end by an eccentric 26 fast to the shaft connecting the two eccentrics. The drum 18 at the ends carries disks 28 each constituting an outer head for the respective winding surfaces 19 and 20 and also constituting a friction disk, the heads 28 being of like diameter.

Partly surrounding each head or disk 28 is a brake strap 29 fast at one end to a fixed part of the frame of the machine, as, for instance, a cross beam 30, and at the other end to a cross beam 31 carried by posts 32 directed on a respective one of the guideways 24. The brake bands 29 where secured to the cross beam 31 terminate in adjusting eye bolts 33, whereby the bands 29 may be taken up or let out as occasion may require. The posts 32 are made firm and rigid in position by brace rods 34 and 35 which at the end remote from the posts may be secured to the frame of the chassis 1. Fast to and extending between the upper ends of the posts 32 is a rod 36 carrying a guide pulley 37 free to rotate and slide on the rod. Mounted on the frame 1 to the rear of the jackshaft 15 are other guideways 38 similar to the guideways 24 and carrying adjustable journal blocks 39 for a rock shaft 40 with eccentric blocks 41 at the end of the rock shaft 40. There is a winding drum 42 carried by the shaft 40 but free to rotate thereon the same as the drum 18 is free to rotate on the shaft 27. The drum 42 is provided at the ends with friction heads or friction disks 43 partially surrounded by the brake straps 44, each with one end fast to an adjusting eye bolt 45 carried by the beam 31, and at the other end fast to any convenient part of the chassis frame, as, for instance, to a cross beam 46 secured to and extending between the longitudinal sidebeams of the chassis 1 and appropriately arched to provide a bearing for the rear end of the shaft 7 adjacent to the universal joint 9. The drum 42 may have a number of winding surfaces 45ª, 46ª, 47, of different diameters.

The jackshaft 15 carries friction disks or wheels 48 fast to said shaft and in the path of both the friction disks 28 and 43 with the friction disks 28 and 43 under the control of the friction bands 29 and 44.

The shaft 27 has secured to it a hand lever 48ª, and the shaft 40 has secured to it a lever 49, the two levers 48ª and 49 being designed for manipiulation by an operator to move the respective friction disks into operative relation to the friction disks 46 or into operative relation to the brake bands 29 and 44 respectively.

At the rear of the chassis frame there may be located a tool carrier 50.

Carried by the side members of the frame near the rear end thereof are the legs of a crane 51, the crane legs being supported by hinged bolts 52 readily adjustable lengthwise of the chassis by means of holes or perforations 53 in the flanges of the side members of the chasis 1. In the particular showing of the drawings the crane is of the A type and may be of any height desired when lifted toward the upright position. At the upper end the crane carries a guide sheave 54 for a rope or cable 55 extending over the shaft and having at its lower end a hook 56 or other holding means, and at the end remote from the hook made fast to an adjacent portion of the drum 42. The upper end of the crane also has fast thereto another pulley 56ª through which there extends a rope or cable 57 fast at one end to the pulley 31 and at the other end carried over the roller 37, from whence it is carried to an adjacent portion of the drum 18 to which it is secured.

The lever 48ª as indicated in the drawings is provided with a thumb latch 58 engaging a rack segment 59 on the adjacent journal bearing 23. The lever 48ª is so situated as to be within convenient reach of the operator of the tractor or truck and the lever 49 is assumed to be provided with connecting means whereby the operator of the vehicle may conveniently reach it from the usual operator's seat. Such seat and the connecting means are not shown in the drawings as they are common features of trucks or tractors where separated parts are operated from a common point. In like manner the clutch 8 is assumed to be operable from the driver's seat, the usual groove for the operating fork being indicated in Figs. 2 and 3 at 60.

It sometimes occurs that it is convenient to operate other mechanisms by the power unit of the truck when the driving side of the truck is disconnected and for this purpose the jackshaft 15 has a driving pulley 61 at one end and a pitman crank 62 or other suitable means at the other end. These two last named parts are to be taken as indicative of any suitable arrangement for increasing the utility of the machine.

The truck equipped as described is particularly valuable in pulling pipes or tools from oil wells or ordinary water wells and for various other uses to which it may be put where facility of transportation from place to place and of putting out the traction side of the vehicle in utilizing the power side is desirable. When the machine is being transported from place to place, the friction bands 29 and 44 may be tightened to an extent to hold the friction disks 20 and 43 against motion, and these same bands may be used to hold any loads which may have been lifted to an elevated position, or may be loosened to an extent to permit the loads to gravitate to any desired degree, the bands then serving as brakes. The structure is such that when the power unit of the truck is connected to the jack shaft 15, some one or more of the drums 45ª, 46ª and 47 may be utilized for adjusting the crane 51, or, by means of the hook 56, may elevate or lower the load, as the operator may desire.

What is claimed is:

1. In a motor vehicle, a power unit, a power shaft between the power unit and the drive axle of the vehicle, a jack shaft transverse of the length of the whole, friction disks on the jack shaft, winding drums to the front and to the rear of the jack shaft and movable individually into and out of engagement with the friction disks on the jack shaft, brake bands individual to and encircling the drums, and means for moving the drums into active relation to the friction disks on the jack shaft or to the brake bands.

2. In a motor vehicle, a power unit, a power shaft between the power unit and the drive shaft of the vehicle, a jack shaft transverse of the vehicle, means on the jack shaft for taking power therefrom, friction disks on the jack shaft, winding drums forward of and to the rear of the jack shaft, means for individually moving the winding drums into frictional engagement with the disks on the jack shaft, brake bands individual to and surrounding the drums, and means for individually moving the drums into active relation to the friction disks on the jack shaft or to the brake bands when the latter are loosened from the brake bands.

3. In a motor vehicle, adjacent spaced winding drums thereon, a jack shaft intermediate of the drums, power means for driving the vehicle and connected to the jack shaft, friction drive means between the jack shaft and the separate winding drums, with each drum having controlling means for moving it into and out of frictional engagement with the jack shaft, at will, brake means for each drum active to the drum only when moved out of driving relation to the jack shaft, and a crane with separate lifting and controlling cables, one connected to one winding drum and the other to the other winding drum.

4. In a motor vehicle, adjacent spaced winding drums thereon, a jack shaft intermediate of the drums, power means for driving the vehicle and connected to the jack shaft, friction drive means between the jack shaft and the separate winding drums, with each drum having controlling means for moving it into and out of frictional engagement with the jack shaft, at will, brake means for each drum active to the drum only when moved out of driving relation to the jack shaft, and a crane with separate lifting and controlling cables, one connected to one winding drum and the other to the other winding drum, said crane having supporting means on the vehicle movable lengthwise of the latter toward or from the jack shaft to vary the position and overhang of the crane with respect to said jack shaft.

In testimony that I claim the foregoing as my own, I have hereto affixed my signature.

LEO HAUBERT.